United States Patent [19]

Boyce

[11] Patent Number: 4,587,423
[45] Date of Patent: May 6, 1986

[54] METHOD FOR GRAVEL PACK EVALUATION

[75] Inventor: James R. Boyce, Ridgefield, Conn.

[73] Assignee: Schlumberger Technology Corporation, New York, N.Y.

[21] Appl. No.: 636,307

[22] Filed: Jul. 31, 1984

[51] Int. Cl.[4] .............................................. G01V 5/12
[52] U.S. Cl. .................................... 250/269; 250/262
[58] Field of Search ....................... 250/269, 262, 256; 364/422

[56] References Cited

U.S. PATENT DOCUMENTS

| | | | |
|---|---|---|---|
| 4,340,934 | 7/1982 | Segesman | 364/422 |
| 4,436,996 | 3/1984 | Arnold et al. | 250/256 |
| 4,442,701 | 4/1984 | Cowherd et al. | 250/269 |

OTHER PUBLICATIONS

"Gravel Pack Evaluation", Marvin R. Neal, presented 57th Annual Fall Technical Conf., SPE, Sep. 1982, publ. Journal of Petroleum Technology, Sep. 1983, pp. 1611-1616.

"A Quantitative Approach to Gravel Pack Evaluation", Neal and Carroll, 6th SPE Formation Damage Symposium, Feb. 13-14, 1984.

*Primary Examiner*—Carolyn E. Fields
*Attorney, Agent, or Firm*—Brumbaugh, Graves, Donohue & Raymond

[57] ABSTRACT

Based on Monte Carlo modeling of gravel pack conditions in a completed borehole, a straightforward expression for the determination of percent packing as a function of known or measurable borehole quantities is derived, from which an accurate quantitative gravel pack log may be obtained for purposes of evaluating gravel pack quality. The method includes using a logging tool with a gamma source and gamma detector.

4 Claims, 5 Drawing Figures

METHOD FOR GRAVEL PACK EVALUATION

DESCRIPTION

1. Technical Field

The present invention relates to gravel pack logging and, more particularly, to an improved method for providing a reliable quantitative evaluation of gravel pack quality.

2. Background Art

Many oil wells are completed with internal gravel pack assemblies to prevent sand infiltration into the production tubing. A reliable method of evaluating the quality of the gravel pack in situ, at the time of its construction, is needed in order to improve the effectiveness of the gravel pack and to reduce the chances that a workover will be required later.

Prior investigations of this problem have indicated the applicability of wireline logging techniques to the evaluation of gravel packs. In a paper entitled "Gravel Pack Evaluation", first presented (Paper SPE 11232) at the 57th Annual Fall Technical Conference and Exhibition of the Society of Petroleum Engineers of AIME, New Orleans, LA, September, 1982, published Journal of Petroleum Technology, September, 1983, pp. 1611–1616, M. R. Neal described the responses of three well logging tools, the compensated neutron tool (neutron source and two detectors), the nuclear fluid density meter tool (gamma ray source and one detector), and the dual-spacing gamma ray tool (gamma ray source and two detectors), to various gravel pack situations and showed that each tool responded well to changes in density of the material in the annulus between the screen (of the gravel pack hardware) and the casing. Although Neal's work provided useful qualitative information concerning gravel pack quality, it did not provide a procedure by which a quantitative evaluation could be made.

Further research by M. R. Neal and J. F. Carroll, as reported in a paper entitled "A Quantitative Approach to Gravel Pack Evaluation", 6th SPE of AIME Formation Damage Symposium, Bakersfield, CA, Feb. 13–14, 1984, demonstrated that tool response (count rate) could be directly related to the percent void space in the gravel pack, and led to the development of interpretive procedures for determining percent packing when field hardware is the same as that used for laboratory calibration measurements and for making a quick-look quantitative approximation when the well hardware differs from laboratory hardware. A computer-assisted technique for visualizing the quality of the gravel pack at the well site was also developed and described.

It is desirable, however, both to simplify quantitative gravel pack evaluation techniques and to extend the applicability thereof to borehole and gravel pack conditions other than those specifically measured in the laboratory.

DISCLOSURE OF THE INVENTION

There is provided, according to the present invention, a method for investigating a gravel pack located in the annulus between the tubing/screen and the casing of a borehole, comprising the steps of:

moving a logging tool, including a gamma ray source and at least one gamma ray detector, through the tubing/screen over the depth region of the gravel pack;

deriving a measurement ($N_{T,S}'$) of the number of gamma rays detected by said detector over a predetermined time interval; and determining the percent packing (P) of the gravel pack at the depth of measurement in accordance with the relationship:

$$P = \frac{-1}{\alpha}\left[\rho_f + \left(\frac{1}{B'_{T,S}}\right) \times \ln\left(\frac{N'_{T,S}}{A'_{T,S}}\right)\right]$$

$N_{T,S}'$ is the measured count rate for the condition of blank tubing (denoted by subscript T) or gravel pack screen (denoted by the subscript S), whichever is present at the depth of measurement, and $\alpha$, $\rho_f$, $B_{T,S}'$ and $A_{T,S}'$ are known parameters or constants of the borehole conditions as described hereinafter.

By a straightforward solution of the foregoing relationship, an accurate quantitative determination of percent packing in completed wells can readily be obtained. Because of the simplicity of the calculation, the percent packing determination may be made on-line at the well site to provide immediate information on gravel pack quality to the operator, or, if desired, it may be carried out later at a central processing site based on the recorded tool response. In either case, a reliable gravel pack log can be obtained with the resulting advantages of avoiding sand production and subsequent gravel pack workovers.

MODE FOR CARRYING OUT THE INVENTION

Figure 1:
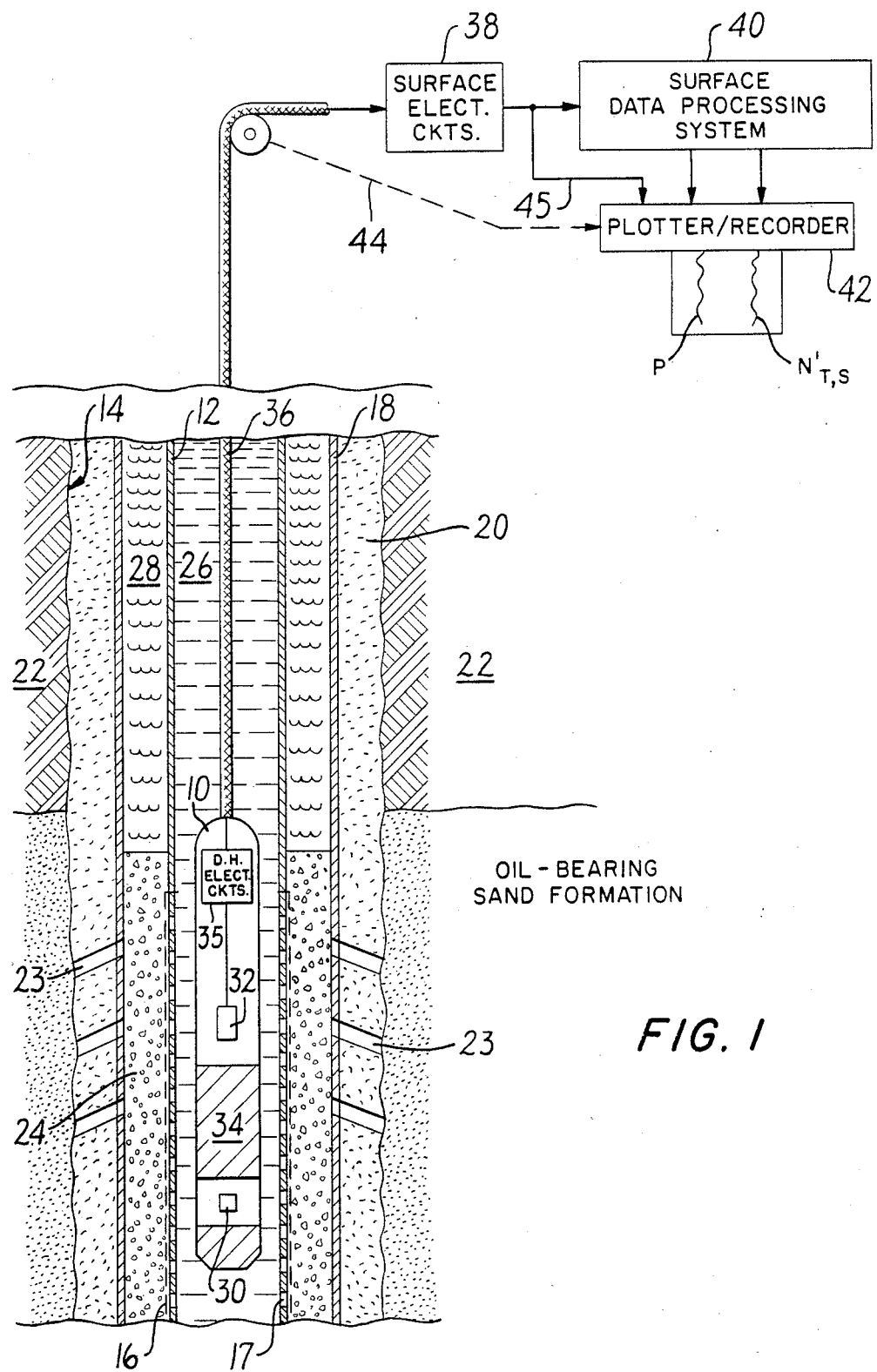
FIG. 1 is a schematic view of one embodiment of a well logging tool and associated surface processing components for implementing the improved gravel pack evaluation technique of the present invention.

An illustrative embodiment of a gravel pack logging tool useful in practicing the present invention is shown in FIG. 1. The tool includes a temperature-and-pressure resistant sonde 10 that is adapted to be suspended in and moved through a production tubing string 12 located within a borehole 14. The tubing includes a gravel pack screen, which is indicated schematically at 16 and which may be conventional. Holes 17 are formed in the tubing 12 inside of the screen to admit oil to the tubing. The borehole is shown as completed, i.e., a casing 18 has been cemented 20 to the surrounding formations 22 and a gravel pack 24 has been constructed over the region of the screen 16. The casing 18 and cement annulus 20 have been perforated, as at 23, opposite the screen 16 to permit oil flow from the formations 22 to the tubing 12. Both the tubing 12 and the annulus between the tubing 12 and the casing 18 are shown as fluid-filled, as at 26 and 28, respectively.

The tool 10, which may, for example, comprise the aforementioned fluid density meter tool, includes an omnidirectional gamma ray source 30 and at least one gamma ray detector 32 spaced therefrom and shielded, as at 34, against direct irradiation along the tool axis. The source 30 may comprise any suitable gamma ray emitter, such as cesium 137, and the detector 32 may also be conventional, such as a NaI scintillation detector. Gamma rays from the source 30 interact with the materials in the borehole environment and are in part scattered back to the detector 32. The resulting detector signals are applied to downhole electronic circuits 34 for amplification, coding or the like for transmission to the earth's surface over an armored cable 36.

At the surface, the detector signals are received by electronic circuits 38, where they are decoded or otherwise converted and restored as required for further processing. Thereafter they are applied to the data processing system 40, which may comprise a digital apparatus such as a PDP 11/34 manufactured by the Digital Equipment Corp. and specially modified, as by stored instructions, to carry out the present invention. As described hereinafter, the data processing system 40 generates a percent packing output P and a tool count rate output $N_{T,S}'$ which are applied to a plotter/recorder 42 for recording as a function of depth in the bore hole. The usual winch and depth-recording linkage, indicated schematically at 44, is provided for this purpose.

If desired, the derivation of percent packing may be carried out remotely, as would be the case, for instance, when a computer is not available at the well site. In that case, the detector signals from the circuits 38 could be applied directly to the recorder 42, as indicated by the line 45, and recorded on magnetic tape for subsequent transmission to the remote site.

The number of gamma rays returning to the detector 32 is an indication of the density of the material through which they traveled. High density materials cause more gamma rays to be slowed down and absorbed, while lower density materials allow more gamma rays to be returned to the detector. In a gravel packed well everything remains constant except the annular space between the casing and the screen or tubing. This space can be totally filled with gravel, partially filled with gravel, or have void spaces containing no gravel. In each of these cases, the volume that is not filled with gravel is filled with some type of fluid of a known density. Since the density of the gravel is different from the density of the fluid, it is possible quantitatively to correlate gamma ray count rates to percent pack.

In accordance with the present invention, an improved technique for the quantitative evaluation of gravel packs has been developed. The technique has been verified by the application of mathematical modeling of a logging tool of the configuration illustrated in FIG. 1 and by experimentation. The modeling approach uses MCNP, a generalized random sampling technique for simulating the transport of neutrons and photons in a three-dimensional geometry, as described in "MCNP —A General Monte Carlo Code for Neutron and Photon Transport", Los Alamos National Laboratory, Los Alamos, N.M. 87545.

The MCNP code calculates an estimate of radiation flux anywhere in a specified problem by generating (simulating) histories of the individual paths for a large number of particles (photons in the present model). The problem is specified for the code by subdividing the geometry into small cells and characterizing the material in each cell. The history of each energetic photon as it leaves the source and traverses a given cell is determined by using the known interaction cross sections of the material in that cell. By tracking large numbers of photons in this manner, MCNP generates the radiation flux anywhere in the geometry under study. In the gravel pack problem, the primary interest is the flux in the detector cells.

Figure 2:
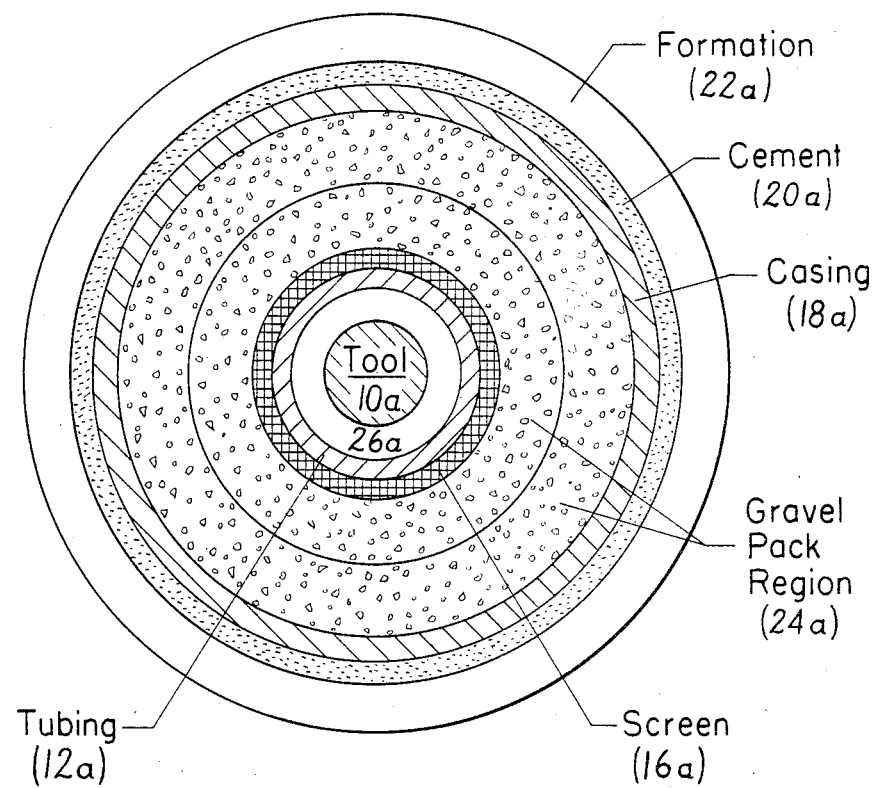
FIG. 2 is a horizontal cross section of an MCNP model of FIG. 1.

FIG. 2 shows a horizontal cross section of the gravel pack model developed for the MCNP model. The geometry is symmetrical about the borehole axis which is in the center of the figure. Each section of the figure represents a three-dimensional cylindrical cell, having finite vertical and horizontal dimensions. Thus, although not shown, it will be understood that the vertical cross section of the model is also divided into a plurality of sections to define the upper and lower bounds of each cell. Proceeding radially from the borehole axis in FIG. 2 are the tool cells 10a (which include cells for the pressure housing and, at the appropriate elevations in the model, for the source 30, the detector 32 and other internal components of the tool), the cells 26a for the volume (shown fluidfilled in FIG. 1) between the tool 10 and the tubing 12, the cells 12a for the blank tubing 12, the cells 16a for the screen 16, the cells 24a for the gravel pack region 24, the cells 18a for the casing, the cells 20a for the cement bonding, and the cells 22a for the formation. The distribution of the material within each cell is assumed to be uniform both radially and circumferentially.

After defining the appropriate geometry of the cells, the characteristics of the material in each cell are specified in terms of elemental content and density. For example, the tubing 12 is assumed to be iron whose density is determined from its weight per foot and its dimensions. In the case of the gravel pack region, two conditions are considered, 0% packing, i.e., no gravel pack, in which case only the fluid 28 and its density are used, and 100% packing, in which case the assumption is made that the cell volume is sandstone having a porosity of 40 p.u. (porosity units). 0% packing corresponds to 100 p.u.

In one form of commercially available gravel pack screen, which is illustrated schematically in FIG. 1, the screen 16 is wrapped around the outside of the tubing 12 and the tubing inside the screen is formed with holes 17. The tubing size inside of the screen 16 is typically the same as the blank tubing with no screen. The blank tubing, however, has no holes.

In the model, the screen 16 (including the interior perforated tubing) is assumed to be made of uniformly distributed iron having a density determined by its weight per foot and its dimensions. Using this information and assuming an iron density, e.g., 7.87 g/cc, the volume fraction for the iron is calculated. The remaining volume of the cell 16a (FIG. 2) is assumed to be filled with the borehole fluid 26. The borehole fluid typically might be fresh water, salt water or oil.

The elemental contents and densities of the remaining cells are similarly determined based on the identity and quantity of the materials known or assumed to be present in the respective cells. Once the geometry and material of each cell are defined, an importance value is determined for each cell. As will be understood, such importance values are used in the MCNP variance reduction techniques to reduce the computational time and the uncertainty of the calculations.

Using the foregoing approach, the response of the gravel pack logging tool of FIG. 1 was modeled. The photon flux across the detector cell was integrated over all energies of interest, and the resulting flux calculation was normalized to calibration counts previously determined from experimental data taken with an actual logging tool. In this manner, the resulting modeled counts can be directly compared with the count rate from the logging tool.

For purposes of the model of the gravel pack tool, the calibration configuration was for a 7-inch diameter casing with a 2⅞-inch diameter blank tubing, with fresh water as the borehole fluid and no gravel pack (0% packing). The counts for this configuration were compared to the corresponding Monte Carlo calculations to determine a normalization factor:

$$f_n = \text{counts/flux} \tag{1}$$

which was then applied to the calculations for other configurations.

Figure 4:
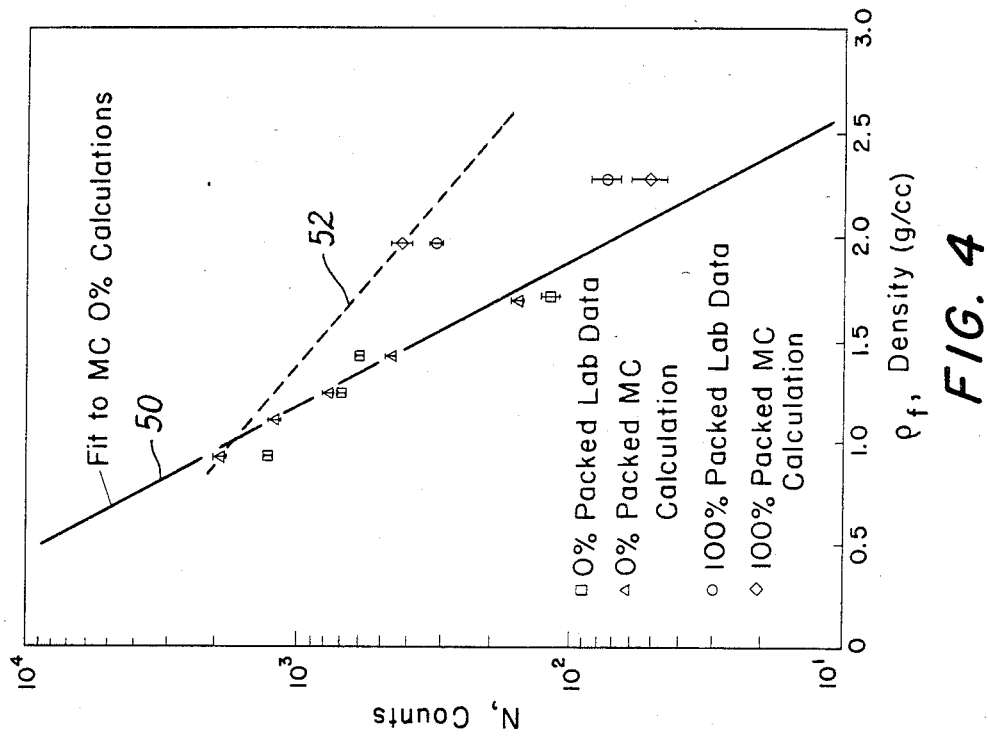
FIG. 4 graphically illustrates the results of MCNP calculations compared with experimental values for a 7-inch casing and a $2\frac{7}{8}$-inch screen.
Figure 3:
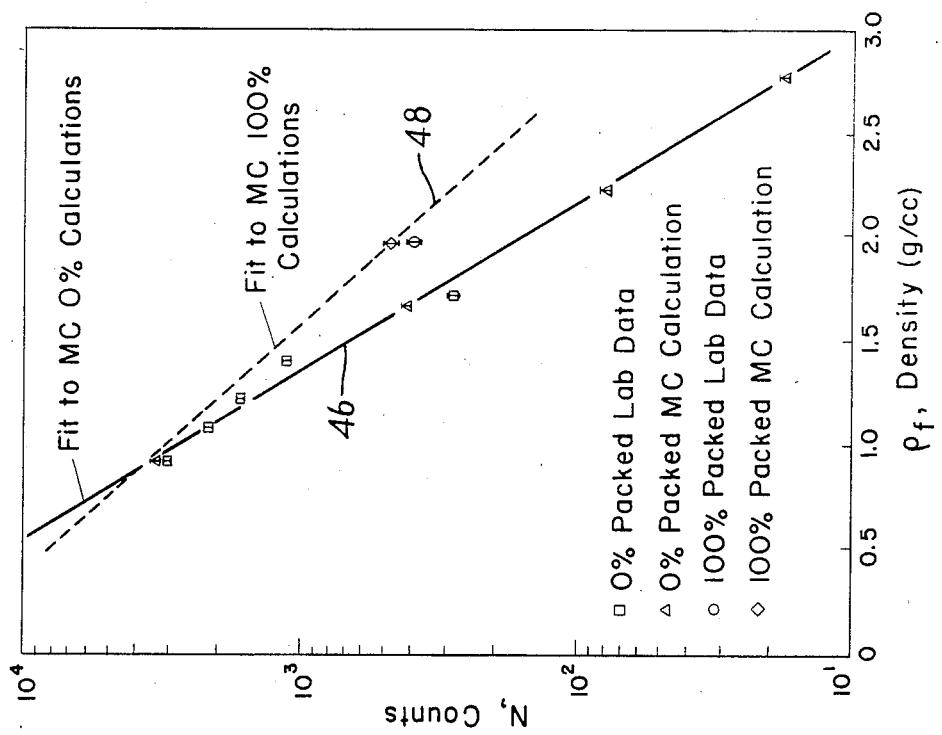
FIG. 3 graphically illustrates the results of MCNP calculations compared with experimental values for a 7-inch casing and a $2\frac{7}{8}$-inch tubing.

Comparisons between model and measured results from a simulated laboratory well were made in order to verify the mathematical model. The laboratory measurements were made for a variety of casing, tubing, screen and fluid types, sizes and densities, all in a laboratory simulation of the downhole environment. The experimental data thus acquired were reported by Neal and Carroll in the aforementioned paper "A Quantitative Approach to Gravel Pack Evaluation" presented at the 6th SPE of AIME Formation Damage Symposium. FIGS. 3 and 4 illustrate exemplary comparisons of the model results with the experimental (Lab.) data.

The results of the Monte Carlo calculations for the case of a 7-inch casing with a 2⅞-inch blank tubing are shown in FIG. 3. The counts N are plotted vs. the density $\rho_f$ of the borehole fluid. The squares are experimental data points and the triangles are the Monte Carlo modeling results, for the configuration of 0% packing. (The bars (I) indicate the range of statistical uncertainty for the individual points, and is approximately ±4% for the calculated points. Not shown in FIG. 3 is an uncertainty in the experimental densities of approximately ±0.06 g/cc.)

The solid straight line 46 in FIG. 3 represents a least-squares fit to the modeling results, and is described by the following equation:

$$N_T = A_T \exp(-B_T \times \rho_f) \tag{2}$$

where $N_T$ is the modeled number of counts;
$A_T$ is a constant given by the y-axis intercept;
$B_T$ is a constant given by the slope of the line 46; and
$\rho_f$ is the fluid density.
The subscript T denotes blank tubing.

As is apparent from FIG. 3, the agreement between the experimental data points and the calculated data points is quite good. The slope $B_T$ of the line 46 represents the sensitivity of the tool to changes in fluid density for the particular configuration of casing and blank tubing modeled.

Also shown in FIG. 3 are points for the configuration of 7-inch casing and 2⅞-inch blank tubing with 100% gravel packing and oil (diesel fuel) as the borehole fluid. As previously mentioned, 100% packing is taken as sandstone at 40 p.u. porosity. The diamond indicates a modeling result and the circle directly below it indicates an experimental data point. The dashed line 48 is a fit to the modeling results for 0% packing and 100% packing in this configuration.

Here, again, the same form of equation fits the results:

$$N'_T = A'_T \exp(-B'_T \times \rho') \tag{3}$$

where the prime indicates gravel packing. The slope $B'_T$ of the line 48 represents the sensitivity of the tool to density changes in the gravel pack region, i.e., the region in FIG. 1 between the blank tubing 12 and the casing 18. The values of $A_T$, $A'_T$, $B_T$ and $B'_T$ are dependent on the downhole configuration, i.e., the size and type of tubing and casing.

As may be seen from FIG. 3, the slope $B'_T$ (gravel packing) is less than the slope $B_T$ (no gravel packing). This results because the volume in which the density is changing in the former case, i.e., the gravel packing region between the tubing 12 and the casing 18, is less than the volume in which the fluid density is changing in the latter case, i.e., the region between the tool 10 and the casing 18. Consequently, the density sensitivity $B'_T$ for the gravel packing region is less than that $B_T$ for the non-packed condition.

It is also to be noted that the sensitivity $B'_T$ of the tool to density changes in the gravel pack region is not a function of density. Thus for any given fluid the counts $N'$ may be described as a function of the degree of gravel packing by drawing a line parallel to the dashed line 48 in FIG. 3 and intersecting the 0% packing-fluid line 46 at the fluid density.

FIG. 4 shows data for a configuration similar to that of FIG. 3 except that a 2⅞-inch screen was used instead of blank tubing. The same symbols are used in FIG. 4 as in FIG. 3 to denote the experimental (Lab.) data and the Monte Carlo calculations for the 0% and 100% packed conditions. Again, the solid line fit 50 to the Monte Carlo calculations for 0% packing is best described by:

$$N_S = A_S \exp(-B_S \times \rho_f) \tag{4}$$

where the subscript S denotes screen. And, similarly to Eq. (3), the calculations for the 100% gravel pack condition, represented by the dashed line 52, are described by:

$$N'_S = A'_S \exp(-B'_S \times \rho') \tag{5}$$

where the prime denotes gravel packing and the subscript S denotes screen.

The constants $A_S$ and $A'_S$ represent the y-axis intercepts of the lines 50 and 52, respectively, and the constants $B_S$ and $B'_S$ represent the respective slopes of those lines. These constants are dependent on the downhole configuration in like manner to the constants $A_T$, etc., as discussed above. $\rho'$ is the electron density of the packed region.

The manner in which $\rho'$ is determined is as follows: It can be expressed as:

$$\rho' = v_f \rho_f + v_m \rho_m \tag{6}$$

where $v_f$ and $v_m$ are the volume fractions of fluid and matrix material (gravel on sand), respectively, and $\rho_f$ and $\rho_m$ are the respective densities of those materials. This equation can be written as:

$$p' = p_f + \beta \times P \tag{7}$$

where $$\alpha = \frac{(1.0 - v'_f) \times (\rho_m - \rho_f)}{100} \tag{8}$$

P is the percent packing expressed in percent and $v'_f$ is the volume fraction of the fluid for 100% pack; e.g., $v'_f = 0.4$ if 100% pack is assumed to be equivalent to 40 p.u.

In order to solve for percent packing P in terms of known quantities, it is necessary first to derive expressions for the two constants $A'_T$ and $A'_s$ (hereinafter referred to collectively as $A'_{T,s}$), where subscript T designates the value of the constant $A'$ for blank tubing and subscript S designates the value of the constant $A'$ for screen.

At the intersection of the percent packing line and the 0% packing line, the following equations hold:

$$N_T = N'_T$$

$$N_S = N'_S$$

or, in collective notation:

$$N_{T,s} = N'_{T,s} \tag{9}$$

and $$p_f = p' \tag{10}$$

Solving for $A'_{S,T}$ in terms of the other quantities, yields the expression:

$$A'_{T,s} = A_{T,s} \exp[--=B_{T,s}-B'_{T,s}) \times p_f] \tag{11}$$

The derivation of percent packing P in terms of known quantities can then be carried out by substituting Eqs. (7), (8) and (11) into Eqs. (3) and (5) and solving for P. This gives the expression:

$$P = \frac{-1}{\alpha} \times \left[ p_f + \left( \frac{1}{B'_{T,S}} \right) \times \ln \left( \frac{N'_{T,S}}{A'_{T,S}} \right) \right] \tag{12}$$

The foregoing illustrative comparisons of FIGS. 3 and 4 show excellent agreement between the model results and the experimental data, giving a high level of confidence to the model and to the accuracy of Eq. (12) as a quantitative measure of the degree of gravel packing. It therefore provides a technique by which tool responses can be obtained for a variety of borehole and gravel-pack conditions not measured in the laboratory, and thus permits gravel packing percentage to be accurately predicted as a function of tool response (count rate) and other known borehole parameters.

Figure 5:
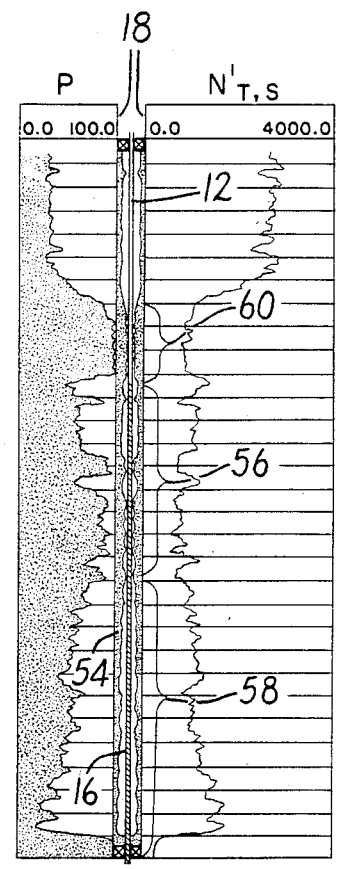
FIG. 5 illustrates the application of the percent packing determination (P) of the invention to an actual log, showing percent packing plotted on the left grid and the gamma ray count rate (i.e., $N_{S,T}'$) of the tool plotted on the right grid, both as a function of depth, with a schematic representation of the tubing, screen and gravel pack interposed between the two grids of the log for illustrative purposes.

FIG. 5 shows the results of applying Eq. (12) to an actual log. The tool response $N'_{T,s}$ is plotted on the right hand graph and percent packing P (from Eq. (12)) is plotted on the left hand graph, both as a function of depth. The region between the graphs is a schematic visualization of the packing in the borehole. In this region, the casing is the left side and the right side, respectively, of the counts graph and the percent pack graph. The tubing 12 and the screen 16 are shown as centered within the casing, and the amount of gravel pack is shown by the dotted regions 54 between the tubing or screen and the casing.

In visualizing the gravel pack in FIG. 5 as a function of percent packing P, it is assumed that the gravel pack starts at the casing wall and extends inwardly from there. Thus where there is less than 100% packing, the voids are shown as being adjacent the tubing 12 or the screen 16. This is done for illustrative purposes, however, and may not be the case in actual fact. That is to say, the voids may be distributed other than adjacent the tubing string. Also, the gravel pack is shown in FIG. 5 as being uniformly distributed circumferentially of the casing, again for illustrative purposes, which likewise may not be the case in actual practice. Eq. (12) affords an accurate determination of percent packing at any given depth, but does not indicate the uniformity of distribution of the gravel pack, either radially or circumferentially, within the casing. It is, however, reasonable to expect that the distribution of the gravel pack will be generally as depicted in FIG. 5 for any given percent packing.

The log of FIG. 5 shows the quality of the gravel pack to be better over the upper region 56 of the screen 16 than over the lower region 58, with a very good pack in the region 60 immediately above the top of the screen. Such a log would indicate the need to repair or rework the gravel pack over at least the lower region 58.

In producing a log such as that shown in FIG. 5 by use of the tool of FIG. 1, the computer in the data processing system 40 is of course pre-programmed to solve Eq. (12) based on the measured and known inputs for the various terms of that equation. As the values of $v_f$, $p_f$ and $p_m$ are known from samples of the fluid and the matrix material in the gravel pack region, these values may be stored in the computer for the calculation of $\alpha$ from Eq. (8) and for the input of $p_f$ into the solution of Eq. (12). The values of $B'_{T,s}$ will likewise be known from the slope of the model curves 50 and 52, and the values of $A'_{T,s}$ can be calculated from Eq. (11), inasmuch as all of the terms of that equation are known and can be stored beforehand in the computer. It is to be noted that the constants $B'_{T,s}$ and $A'_{T,s}$ will each have two values, one for blank tubing and one gravel packing. The value to be used in solving Eq. (12) will depend upon whether the sonde 10 is located opposite the blank tubing 12 or the screen 16. As the depth of the screen is known, the computer can be programmed automatically to select the correct values of the constants as a function of depth as the sonde moves through the borehole.

The programs required to solve Eq. (12) and to calculate the necessary inputs thereto, e.g. and $A'_{T,s}$, are quite straightforward and therefore need not be described in detail here. They are well within the skill of the average programmer in this art.

The tool count rate $N'_{T,s}$ is generated, either downhole or at the surface, by accumulating the detector pulses over a predetermined time interval, which typically would correspond to a desired depth interval of measurement. The count rate value $N'_{T,s}$ is then input into Eq. (12) and the equation is solved for P. The value of P thus obtained for the measurement depth in question is applied to the plotter/recorder 42 to produce the visual log. Preferably, the tool count rate $N'_{T,s}$ is also plotted alongside the percent packing log for comparative purposes.

Although the invention has been described herein with reference to a specific embodiment thereof, it will be understood that such embodiment is susceptible of variation and modification without departing from the inventive concepts disclosed. All such variations and modifications, therefore, are intended to be included within the spirit and scope of the appended claims.

I claim:

1. A method for investigating a gravel pack located in the annulus between the tubing/screen and the casing of a borehole, comprising the steps of:

moving a logging tool, including a gamma ray source and at least one gamma ray detector, through the tubing/screen over the depth region of the gravel pack;

deriving a measurement ($N'_{T, S}$) of the number of gamma rays detected by said detector over a predetermined time interval; and determining the percent packing (P) of the gravel pack at the depth of measurement in accordance with the relationship:

$$P = \frac{-1}{\alpha} \times \left[ \rho_f + \left( \frac{1}{B'_{T,S}} \right) \times \ln\left( \frac{N'_{T,S}}{A'_{T,S}} \right) \right]$$

where $$\alpha = \frac{(1.0 - v'_f) \times (\rho_m - \rho_f)}{100}$$

$\rho_f$ and $\rho_m$ are the density of the fluid and the material, respectively, in the annulus between the tubing/screen and the casing of the borehole;

$v'_f$ is the volume fraction of the fluid in the annulus between the tubing/screen and the casing of the borehole;

$A'_{T, S}$ is a previously determined constant $A'_T$ or $A'_S$ depending upon whether the depth of measurement is opposite the tubing or the screen;

$B'_{T, S}$ is a previously determined constant $B'_T$ or $B'_S$ depending upon whether the depth of measurement is opposite the tubing or the screen; and $N'_{T, S}$ is said measured number of detected gamma rays $N'_T$ or $N'_S$ depending upon whether the depth of measurement is opposite the tubing or the screen.

2. The method of claim 1 further comprising the step of recording the percent packing determination as a function of depth within the borehole.

3. A method for investigating a gravel pack located in the annulus between the tubing/screen and the casing of a borehole, comprising the steps of:

deriving a measurement ($N'_{T, S}$) of the number of gamma rays detected in a predetermined time interval by a gamma ray detector located within the tubing/screen as a result of irradiation of the borehole by a gamma ray source located within the tubing/screen; and determining the percent packing (P) of the gravel pack at the depth of measurement in accordance with the relationship:

$$P = \frac{-1}{\alpha} \times \left[ \rho_f + \left( \frac{1}{B'_{T,S}} \right) \times \ln\left( \frac{N'_{T,S}}{A'_{T,S}} \right) \right]$$

where $$\alpha = \frac{(1.0 - v'_f) \times (\rho_m - \rho_f)}{100}$$

$\rho_f$ and $\rho_m$ are the density of the fluid and the material, respectively, in the annulus between the tubing/screen and the casing of the borehole;

$v'_f$ is the volume fraction of the fluid in the annulus between the tubing/screen and the casing of the borehole;

$A'_{T, S}$ is a previously determined constant $A'_T$ or $A'_S$ depending upon whether the depth of measurement is opposite the tubing or the screen;

$B'_{T, S}$ is a previously determined constant $B'_T$ or $B'_S$ depending upon whether the depth of measurement is opposite the tubing or the screen; and $N'_{T, S}$ is said measured number of detected gamma rays $N'_T$ or $N'_S$ depending upon whether the depth of measurement is opposite the tubing or the screen.

4. The method of claim 3 further comprising the step of recording the percent packing determination as a function of the depth within the borehole.

* * * * *

UNITED STATES PATENT AND TRADEMARK OFFICE
CERTIFICATE OF CORRECTION

PATENT NO. : 4,587,423  
DATED : May 6, 1986  
INVENTOR(S) : James R. Boyce

Page 1 of 2

It is certified that error appears in the above-identified patent and that said Letters Patent is hereby corrected as shown below:

<u>Col.1, line 21</u>, "qravel" should read --gravel--;

<u>Col.2, line 1</u>, "$(N_{T,S}')$" should read --$N'_{T,S})$--;

<u>Col.2, line 13</u>, "$N_{T,S}'$" should read --$N'_{T,S}$--;

<u>Col.2, line 16</u>, "$B_{T,S}'$" should read --$B'_{T,S}$--;

<u>Col.2, line 17</u>, "$A_{T,S}'$" should read --$A'_{T,S}$;

<u>Col.2, line 41</u>, "inchtubing" should read --inch tubing--;

<u>Col.2, line 48</u>, "$N_{S,T}'$" should read --$N'_{S,T}$--;

<u>Col.3, line 29</u>, "$N_{T,S}'$" should read --$N'_{T,S}$--;

<u>Col.6, line 49</u>, "$N'_S = A'_S \exp(-B'_S x \rho')$" should read

--$N'_S = A'_S \exp(-B'_S x \rho')$--

<u>Col.6, line 53</u>, "$A_S$ and $A'_S$" should read --$A_S$ and $A'_S$--;

<u>Col.6, line 55</u>, "$B_S$ and $B'_S$" should read --$B_S$ and $B'_S$--

<u>Col.7, line 1</u>, "$\rho' = \rho_f + \beta \times P$" should read --$\rho' = \rho_f + \alpha \times P$--;

UNITED STATES PATENT AND TRADEMARK OFFICE
CERTIFICATE OF CORRECTION

PATENT NO. : 4,587,423

DATED : May 6, 1986

INVENTOR(S) : James R. Boyce

It is certified that error appears in the above-identified patent and that said Letters Patent is hereby corrected as shown below:

<u>Col. 7, line 24</u>, "$N_S = N'_S$" should read --$N_S = N'_S$--;

<u>Col. 7, line 28</u>, "$N_{T,S} = N_{T,S}$" should read --$N_{T,S} = N'_{T,S}$--;

<u>Col. 8, line 56</u>, after "e.g." insert --$\alpha$--.

Signed and Sealed this

Twenty-fifth Day of November, 1986

Attest:

DONALD J. QUIGG

*Attesting Officer*  *Commissioner of Patents and Trademarks*